United States Patent
Vyunova et al.

(10) Patent No.: US 11,134,461 B2
(45) Date of Patent: Sep. 28, 2021

(54) METHODS AND SYSTEMS FOR MAKING A DETERMINATION OF WHETHER A MOBILE DEVICE IS POSITIONED INDOORS OR OUTDOORS

(71) Applicant: HERE GLOBAL B.V., Eindhoven (NL)

(72) Inventors: Tatiana Vyunova, Tampere (FI); Stanislav Krainikov, Tampere (FI); Pavel Ivanov, Tampere (FI); Artem Vassilyev, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/707,236

(22) Filed: Dec. 9, 2019

(65) Prior Publication Data

US 2021/0176726 A1    Jun. 10, 2021

(51) Int. Cl.
*H04W 64/00* (2009.01)
*H04W 4/021* (2018.01)
*H04W 4/029* (2018.01)
*H04W 4/02* (2018.01)
*H04W 4/33* (2018.01)
*G01S 5/02* (2010.01)

(52) U.S. Cl.
CPC ......... *H04W 64/00* (2013.01); *G01S 5/0252* (2013.01); *H04W 4/021* (2013.01); *H04W 4/023* (2013.01); *H04W 4/029* (2018.02); *H04W 4/33* (2018.02)

(58) Field of Classification Search
CPC ....... H04W 64/00; H04W 4/33; H04W 4/029; H04W 4/021; H04W 4/023; G01S 5/0252
See application file for complete search history.

(56) References Cited

U.S. PATENT DOCUMENTS

| 9,008,694 B2 | 4/2015 | Fuller et al. |
| 9,521,645 B1 | 12/2016 | Zhao et al. |
| 9,903,755 B2 | 2/2018 | Albadawi et al. |
| 10,423,926 B1 * | 9/2019 | Nagpal ................ H04B 17/318 |

(Continued)

OTHER PUBLICATIONS

Zhou et al., Nanyang Technological University, Technological University IODetector: A Generic Service for Indoor Outdoor Detection, Nov. 6, 2012. https://www.ntu.edu.sg/home/limo/papers/SenSys12_IODetector.pdf.

(Continued)

*Primary Examiner* — Muthuswamy G Manoharan
(74) *Attorney, Agent, or Firm* — Michael Krasniansky

(57) ABSTRACT

Example implementations may relate to making a determination of whether a mobile device is positioned indoors or outdoors. More specifically, processor(s) may detect that the mobile device is connected to a particular access point and may determine that the particular access point is stationary rather than moving. In response to determining that the particular access point is stationary, the processor(s) may determine (i) a distance between the mobile device and the particular access point, and/or (ii) a connection duration representing a length of time that the mobile device has been connected to the particular access point. Based at least on the determined distance and/or on the determined connection duration, the processor(s) may then make the determination of whether the mobile device is positioned indoors or outdoors.

18 Claims, 9 Drawing Sheets

(56) References Cited

U.S. PATENT DOCUMENTS

| | | | | |
|---|---|---|---|---|
| 2010/0317366 | A1* | 12/2010 | Shen | G01S 5/0252 |
| | | | | 455/456.1 |
| 2014/0004886 | A1* | 1/2014 | Gillett | H04W 48/18 |
| | | | | 455/456.6 |
| 2014/0253385 | A1* | 9/2014 | Amizur | G01S 5/0236 |
| | | | | 342/387 |
| 2015/0097731 | A1* | 4/2015 | Russell | G01S 19/48 |
| | | | | 342/450 |
| 2016/0014554 | A1 | 1/2016 | Boudreau et al. | |
| 2016/0029338 | A1 | 1/2016 | Gandhi | |
| 2017/0295458 | A1* | 10/2017 | Gao | H04W 64/003 |
| 2018/0262961 | A1* | 9/2018 | Okvist | H04W 36/32 |
| 2019/0273817 | A1* | 9/2019 | Ueno | G05B 19/07 |

OTHER PUBLICATIONS

Saffar et al., IEEE, Machine Learning with partially labeled Data for Indoor Outdoor Detection. Feb. 12, 2019, pp. 1-7. https://hal.archives-ouvertes.fr/hal-02011454/document.

Lim et al., IEEE, Radio Map Update Automation for Wifi Positioning Systems, Apr. 2013. https://www.researchgate.net/publication/260668117_Radio_Map_Update_Automation_for_WiFi_Positioning_Systems.

* cited by examiner

METHODS AND SYSTEMS FOR MAKING A DETERMINATION OF WHETHER A MOBILE DEVICE IS POSITIONED INDOORS OR OUTDOORS

FIELD OF THE DISCLOSURE

Embodiments of the present disclosure relate to the field of positioning technologies, and more specifically to methods and systems for making a determination of whether a mobile device is positioned indoors or outdoors.

BACKGROUND

In practice, there may be various reasons as to why an entity, such as a mobile device or a server device, would make a determination of whether the mobile device is positioned indoors or outdoors. For example, the entity could seek to determine whether the mobile device transitioned from being outdoor to being indoors, so that the entity could determine whether or not to trigger an indoor-positioning process for estimating (e.g., continuously or from time-to-time) an indoor position of the mobile device. Such a process could assist a user of the mobile device with navigation through an indoor environment and could provide other benefits as well. Other reasons are further contemplated in the present disclosure.

Although some approaches for making the above-mentioned determination have been developed, such approaches have various limitations.

For example, the entity could attempt to make the determination at issue by evaluating whether or not Global Navigation Satellite System (GNSS) service is available to the mobile device, since GNSS service is often unavailable indoors and available outdoors. Yet, absence of a GNSS signal does not guarantee that the mobile device is indoors, because the mobile device could also encounter poor or no GNSS reception in some outdoor areas, such as urban canyons. Moreover, availability of GNSS service does not guarantee that the mobile device is outdoors, because GNSS service could be available to the mobile device at some indoors locations, such as when a user of the mobile device is nearby a window of a building or the like.

In another example, the entity could attempt to make the determination at issue by evaluating whether or not the mobile device is connected to a Wi-Fi access point, which is likely positioned indoors. Yet, mere connection to a Wi-Fi access point does not guarantee that the mobile device is indoor, because Wi-Fi signals may penetrate an outdoor area outside of the indoor area at which the Wi-Fi access point is positioned, which in turn makes it possible for the mobile device to connect to the Wi-Fi access point while the mobile device is outdoors.

In yet another example, the entity could attempt to make the determination at issue by evaluating manually collected data, such as fixed map-matched geofences and/or social media check-in information indicating a current location of a user of the mobile device, among others. Yet, such solutions may not be scalable and/or reliable, because they often depend on how active user(s) are in providing such data as well as on accuracy of the provided data, among other factors.

Given this, because existing approaches have numerous limitations, a technical improvement is desired with respect to making the above-mentioned determination.

SUMMARY

Disclosed herein is an improved approach for making a determination of whether a mobile device is positioned indoors or outdoors. In practice, the disclosed approach could be performed by an entity such as the mobile device itself and/or a server device in communication with the mobile device, among other possibilities. In any case, in accordance with the disclosed approach, the entity could make the determination at issue by evaluating proximity and connection duration of the mobile device to a stationary access point to which the mobile device is connected.

More specifically, the entity could determine that the mobile device is connected to a stationary (e.g., Wi-Fi) access point, and could then responsively determine (i) a distance indicating how close the mobile device is to the access point and (ii) a connection duration representing how long the mobile device has been connected to the access point. Generally, the distance at issue being shorter may indicate a higher probability of the mobile device being indoors, and vice versa. Also, the connection duration being longer may indicate a higher probability of the mobile device being indoors, and vice versa. Thus, the entity could make the determination of whether the mobile device is positioned indoors or outdoors based at least on the determined distance and on the determined connection duration.

Given this, the disclosed approach could enable the entity to make the above-mentioned determination with a relatively high level of accuracy, as well as in a more reliable and scalable manner, especially compared to existing approaches. And such technical advantages could in turn lead to additional technical improvements.

For example, the disclosed approach could enable the entity to more accurately detect an outdoor-to-indoor transition for the mobile device. In turn, such detection could enable the entity to initiate an indoor-positioning process in a more timely and accurate manner. Additionally or alternatively, the entity could respond to such detection by causing the mobile device to at least temporarily disable, discard, or filter out GNSS measurements while the mobile device is positioned indoors, thereby helping to significantly decrease power consumption by the mobile device while the mobile device is indoors. And because the outdoor-to-indoor transition can be detected more accurately with the disclosed approach, the disclosed approach can help provide the described benefit of decreased power consumption by the mobile device without risking a situation in which GNSS measurements are inadvertently made unavailable while the mobile device is outdoors. Other advantages are further contemplated herein.

Accordingly, in one aspect, disclosed is a method for making a determination of whether a mobile device is positioned indoors or outdoors. The method involves: detecting, by one or more processors, that the mobile device is connected to a particular access point; determining, by the one or more processors, that the particular access point is stationary; in response to determining that the particular access point is stationary, determining, by the one or more processors, (i) a distance between the mobile device and the particular access point, and (ii) a connection duration representing a length of time that the mobile device has been connected to the particular access point; and based at least on the determined distance and on the determined connection duration, making the determination, by the one or more processors, of whether the mobile device is positioned indoors or outdoors.

In another aspect, disclosed is an apparatus including one or more processors, a non-transitory computer readable medium, and program instructions stored on the non-transitory computer readable medium. The program instruction may be executable by the one or more processors to: detect that a mobile device is connected to a particular access point; determine that the particular access point is stationary; in response to determining that the particular access point is stationary, determine (i) a distance between the mobile device and the particular access point, and (ii) a connection duration representing a length of time that the mobile device has been connected to the particular access point; and based at least on the determined distance and on the determined connection duration, make a determination of whether the mobile device is positioned indoors or outdoors.

In yet another aspect, disclosed is a non-transitory computer readable medium having stored thereon instructions executable by one or more processors to cause a mobile device or a server device to perform operations. The operations may include: detecting that a mobile device is connected to a particular access point; determining (i) a distance between the mobile device and the particular access point, and (ii) a connection duration representing a length of time that the mobile device has been connected to the particular access point; and based at least on the determined distance and on the determined connection duration, making a determination of whether the mobile device is positioned indoors or outdoors.

These as well as other features and advantages of the invention will become apparent from the following detailed description considered in conjunction with the accompanying drawings where appropriate. It should be understood, however, that the drawings are designed solely for purposes of illustration and not as a definition of the limits of the present disclosure. It should be further understood that the drawings are not drawn to scale and that they are merely intended to conceptually illustrate one or more of the features described herein.

DETAILED DESCRIPTION

Figure 1:
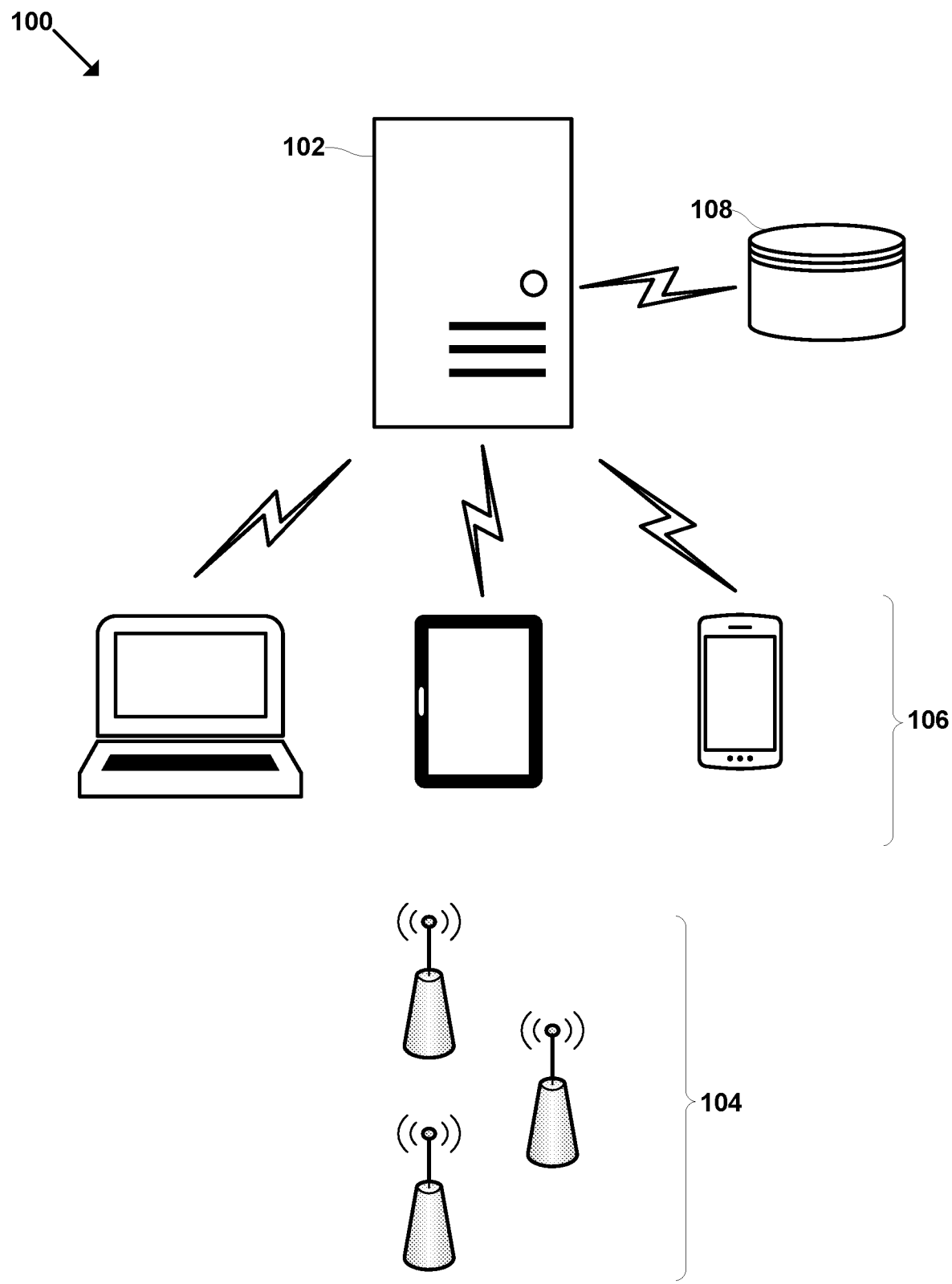
FIG. 1 illustrates an arrangement that may enable a positioning solution, in accordance with an example implementation.

Some embodiments of the present disclosure will now be described in more detail with reference to the accompanying drawings, in which some, but not all, embodiments of the present disclosure are shown. Indeed, various aspects of the present disclosure may be embodied in different forms and should not be construed as limited to the embodiments set forth herein.

I. Example Positioning Systems

Positioning methods that are seamless and available at all times might rely upon novel systems and solutions that are specifically developed and, if necessary, deployed for this purpose. Traditional positioning technologies, which are mainly used outdoors (e.g., satellite and cellular positioning technologies), cannot always deliver the desired performance that would enable a seamless navigation experience at all times, particularly indoors. For instance, in the case of indoor positioning, satellite-based radio navigation signals simply do not penetrate through the walls and roofs sufficiently for adequate signal reception and cellular signals often have a bandwidth that is too narrow for accurate ranging by default. And in the case in outdoor scenarios, there may be situations where e.g. satellite-based radio navigation provides for insufficient coverage, such as in the event of bad weather or in urban street canyons.

Several dedicated solutions have already been developed and commercially deployed during past years, such as solutions based on technologies like pseudolites (GPS-like short-range beacons), ultra-sound positioning, Bluetooth or Bluetooth LE signals, and wireless local area network (WLAN) fingerprinting. What is typical to these solutions is that they tend to involve either deployment of totally new infrastructure (such as beacons or tags) and/or manual exhaustive radio-surveying of streets and buildings, including all the floors, spaces and rooms. Using such solutions may be rather expensive and will likely take a considerable amount of time to build the coverage to the commercially expected level. Also, the diversity of these technologies makes it difficult to build a globally scalable indoor positioning solution, and integration and testing will become complex if a large number of technologies needs to be supported in consumer devices.

A commercially successful positioning solution would likely be globally scalable, have low maintenance and deployment costs, and offer acceptable end-user experience. To facilitate this, the positioning solution can be based on existing infrastructure in the buildings and on existing capabilities in the consumer devices. For example, the positioning solution could be based on technologies like Wi-Fi and/or Bluetooth, which are already supported in numerous devices, such as smartphones, tablets, laptops and even in the majority of the feature phones. Thus, it is advantageous to develop a positioning solution that uses cellular and/or non-cellular radio signals in a way that (i) makes it possible to achieve desired horizontal and vertical positioning accuracy and (ii) provides the ability to quickly build global coverage.

FIG. 1 illustrates an arrangement 100 that may enable a positioning solution, in accordance with example implementations. Arrangement 100 could include a server system 102, radio devices 104 (could also be referred to as radio nodes or the like), one or more mobile devices such as mobile devices 106, and a database 108. The server system 102, radio devices 104, mobile device(s) 106, and/or database 108 may be configured to communicate with one another via one or more communication links (e.g., via a cellular and/or a non-cellular communication network).

As an initial matter, a mobile device could be any electronic device that is movable from one position to another. For example, the mobile device(s) 106 could be or otherwise include cellular phone(s), personal digital assistant(s), a laptop computer(s), tablet computer(s), and/or wearable device(s), among other options.

Further, radio devices 104 may include any type of device that is configured to emit (and optionally receive) radio signals. For example, the radio devices 104 could include wireless WLAN access point(s), such as a WLAN access point that supports or is otherwise configured according to the IEEE 802.11 standard (e.g., a Wi-Fi access point). Additionally or alternatively, the radio devices 104 could include Bluetooth beacon(s) and/or cellular network node(s) (e.g. Global System for Mobile Communications (GSM), Universal Mobile Telecommunications System (UMTS), and/or Long Term Evolution (LTE) base station(s)), among other options.

Furthermore, server system 102 could take various forms without departing from the scope of the present disclosure. By way of example, server system 102 could include a single server or a plurality of servers (e.g., forming a server cloud). Moreover, server system 102 could be embodied as a positioning server of a positioning system, such as of a non-GNSS based radio positioning system for indoor and/or outdoor positioning, for instance.

In practice, a non-GNSS based radio positioning system could include or otherwise rely on radio devices (e.g., radio devices 104) to support the positioning solution described herein. Such radio devices may include dedicated radio devices (e.g., Bluetooth beacons) that are installed in the environment for which the positioning solution is provided. Additionally or alternatively, the non-GNSS based radio positioning system could make use of existing radio devices, such as WLAN access points and/or cellular network nodes. In any case, the radio devices could be deployed in a particular area, such as an indoor area (e.g., inside of a venue or other building).

Given this arrangement 100, the server system 102 could generate and/or update a radio map for an area, which may in turn enable position estimations for mobile device(s) in the area. Namely, the radio map could enable an entity (e.g., a server system or a mobile device) to determine characteristics of radio signals (e.g., transmitted by radio devices) that are expected to be observable respectively at different locations in the area. Accordingly, the term radio map may refer to any collection of data that provides location-linked information on a radio environment.

More specifically, server system 102 could collect "fingerprint(s)" from mobile device(s). In practice, a fingerprint collected from a given mobile device may contain or otherwise represent a position estimate and measurement(s) by the mobile device. The position estimate may be, for example, based on GNSS data, based on sensor data, based on previously collected radio measurements, and/or may be manually inputted (e.g., via a user interface), among other options. And the measurements may include, for example, radio signal parameter(s) of observed radio signals measured by a mobile device and/or identifiers of radio device(s) that emitted the observable radio signals, among others. In more specific examples, collected fingerprint(s) may respectively contain any feasible combination of the following types of measurements: global and/or local identifier(s) of cellular network node(s), Wi-Fi access point identifier(s), beacon identifier(s), signal strength measurement(s) (e.g., Received Signal Strength (RSS)), pathloss estimate(s), timing measurement(s) (timing advance or round-trip time), speed data, reference position measurement technology, collection device information, battery level data, and/or environment sensor data etc.

In some implementations, such collection of fingerprint(s) could be part of a crowd-sourcing process that occurs continuously or at least from time-to-time. For example, mobile devices of a large number of consumers could continuously transmit fingerprint(s) to the positioning server (e.g., server system 102) collecting the fingerprint(s). Consumers may consent to participation in such a collection process, if their device is equipped with necessary functionality to enable the fingerprint generation and/or collection at issue as a background process, naturally with the end-user consent. Additionally or alternatively, it could be possible to use volunteers to actively survey area(s) so as to enable collection of fingerprint(s) for those area(s).

Given that collection of fingerprint(s) may allow for understanding of how radio signals behave and travel in an area (e.g., a building), the server system 102 could use the collected fingerprint(s) in various ways to generate or update a radio map for the area.

By way of example (and without limitation), the server system 102 could define a grid to cover a site such that each grid point corresponds to a geographical location at the site. If the site (e.g., a building) comprises several floors, a separate grid may be defined for each floor, or a single three-dimensional grid may be defined with one dimension for the different floors.

Given this, if the server system 102 collects a fingerprint from a mobile device (e.g., a report that includes RSS value(s), associated radio device identifier(s), and/or other information as discussed), the server system 102 could map (i) RSS value(s) and/or associated radio device identifier(s) included in that fingerprint to (ii) the grid point corresponding to a geographical location that is closest to the position estimate indicated in that fingerprint. The server system 102 could perform such a process respectively for some or all fingerprint(s) collected from mobile device(s) in the site, so as to generate a grid-based radio map for the site.

In this example, if there are several RSS values for the same radio device that would be mapped to the same grid point, the server system 102 could determine an average value (e.g., arithmetic mean or median value) of those RSS values and associate the average value with the grid point at issue. On the other hand, for grid points to which no RSS values could be mapped due to missing fingerprint(s) from the corresponding areas at the site, the server system 102 could generate RSS values by interpolating surrounding RSS values if possible, and by extrapolating neighboring RSS values otherwise. In this way, the server system 102 could generate the radio map to identify radio devices and/or RSS values expected to be observed respectively at each of a plurality of locations throughout the site. Other (e.g., non-grid based) radio maps are also possible.

In some implementations, the radio map could include, be combined with, or otherwise correspond to another map or layout image representing features of an indoor and/or outdoor area at various locations in the area (e.g., an open area map for a pedestrian walkable area as further described herein). In the context of an indoor area, for instance, such features may include rooms, hallways, entryways (e.g., doors), vertical connectors (e.g., elevators, escalators, and/or stairs), and/or items situated in the indoor area (e.g., furniture), among numerous other possibilities. Given this, the radio map could indicate characteristics of the radio environment respectively at or nearby certain features in the area. Moreover, a mobile device could be configured to display such a radio map, to enable automatic or manual assessment of the radio environment in the area. Such an assessment could help determine whether sufficient extent of fingerprint(s) has been collected in a certain location (e.g., near a certain feature), and may provide other advantages as well.

Once a radio map is generated or updated, the server system 102 could store the radio map in a database 108, so that the server system 102 could refer the radio map or a portion thereof on an as-needed basis and/or so that the server system 102 provide the radio map or portion thereof (e.g., to a mobile device) on an as-needed basis for positioning purposes. Generally, the stored radio map could be associated with an indoor or other space (e.g., a particular building) for which the radio map provides coverage. And the server system 102 and/or a mobile device could select a radio map to be used for positioning purposes that is associated with an indoor (or other) space at which or next to which the mobile device is located. In practice, the server system 102 and/or a mobile device could determine an indoor space at which or next to which the mobile device is located based on GNSS measurement(s) by the mobile device and/or an identifier of an access point to which the mobile device is connected, among other options.

In one case, the server system 102 could use the radio map to estimate a position of a mobile device, such as in response to a request by the mobile device to do so. In particular, the server system 102 could receive, from the mobile device, a measurement report indicating identifiers of radio device(s) and/or RSS values that are observable by the mobile device at the current position of the mobile device, and possibly other radio characteristics observable by the mobile device. In some scenarios, the measurement report could optionally also include other information that might aid in determining a position estimate, such as e.g. barometric information that may assist in determining a floor level as part of the position estimate. Nevertheless, the server system 102 can compare information in the measurement report to the radio map, so as to determine a position estimate. For example, the server system 102 could determine that radio device identifier(s) and RSS value(s) in the measurement report substantially match radio device identifier(s) and RSS value(s) associated with a particular grid point corresponding to a particular geographical location at the site. In turn, the server system 102 could provide, to the mobile device, a position estimate indicative of the particular geographical location at the site.

In another case, the mobile device could use the radio map (or a portion thereof) to estimate its position. To facilitate this, the mobile device could obtain, from the server system 102, at least a portion of the radio map, and could at least temporarily store the radio map locally. Once the mobile device has the radio map locally stored thereon, the mobile device could use the techniques described above in association with the server system 102 so as to estimate its position (e.g., comparing information in a measurement report to the radio map). In this way, the mobile device could engage in "offline" positioning estimations.

Advantageously, the mobile device could engage in "offline" positioning estimations at times when connectivity between the mobile device and the server system 102 is unavailable, at times when it is desired to reduce a load on the server system 102 (e.g., reduce the extent of processing by the server system 102), at times when the mobile device seeks to obtain a position estimate relatively quickly (e.g., a very short time-to-first-fix), and/or in other situations.

In either case, a position estimate obtained using the above-described positioning solution could be used in various ways. For example, the mobile device could display (e.g., via a display device) an indoor navigation application including, e.g., an open area map of an indoor area and visually indicating a position of the mobile device in the indoor area in accordance with the position estimated obtained as described. Other examples are also possible.

Figure 2A:
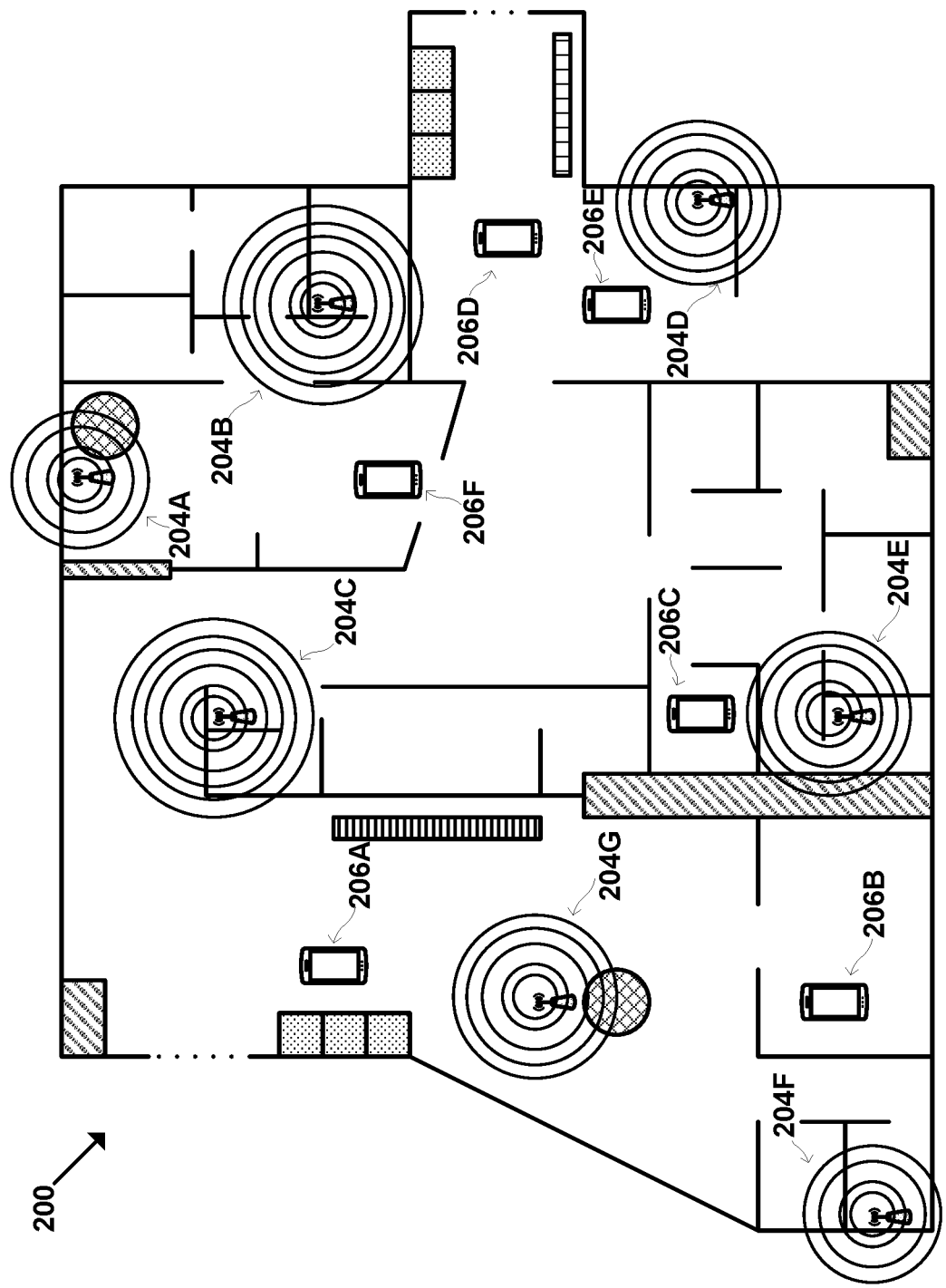
FIGS. 2A and 2B illustrate an indoor area at which radio device(s) and mobile device(s) can be located, in accordance with an example implementation.
Figure 2B:
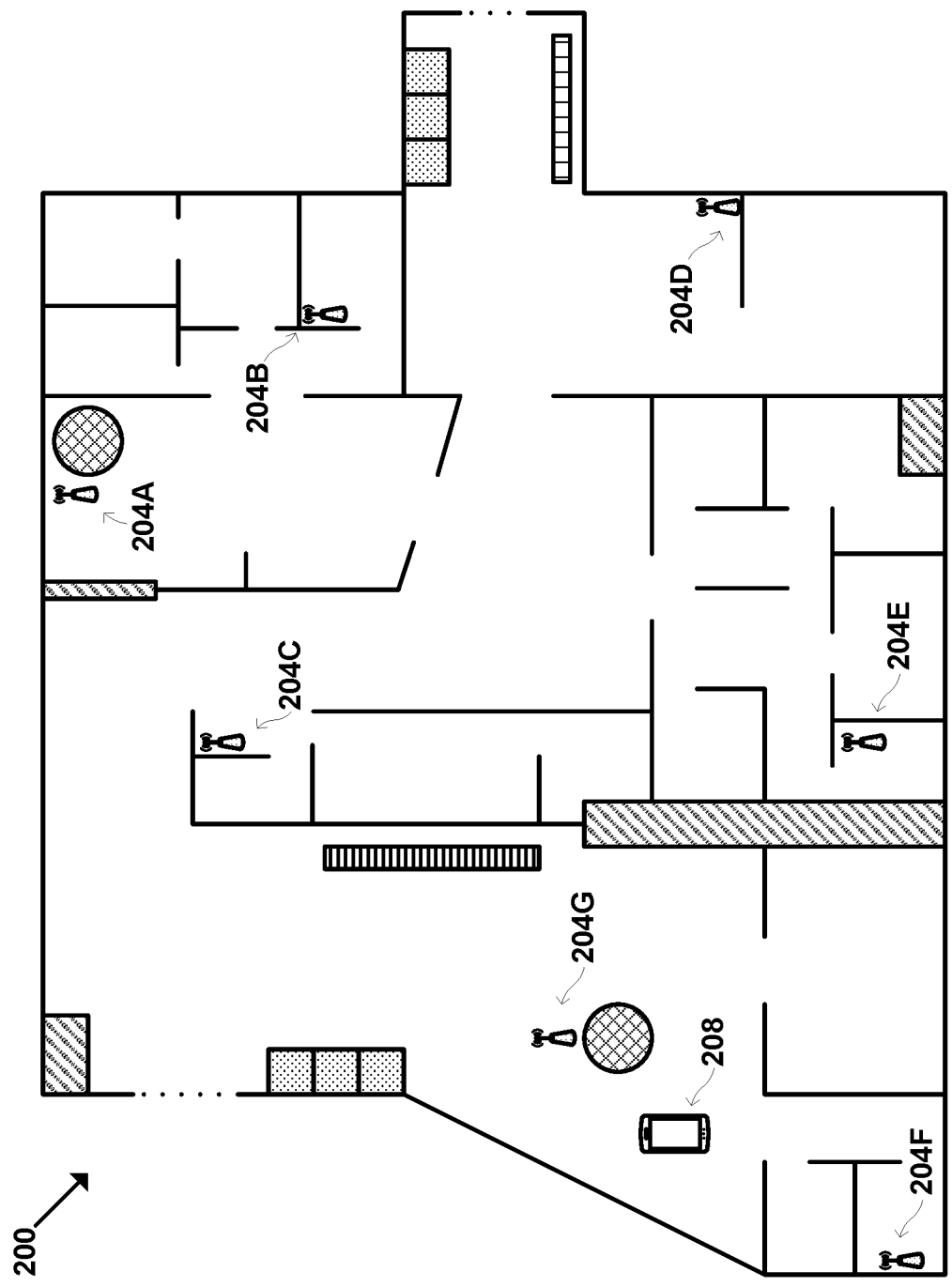
Figure 2C:
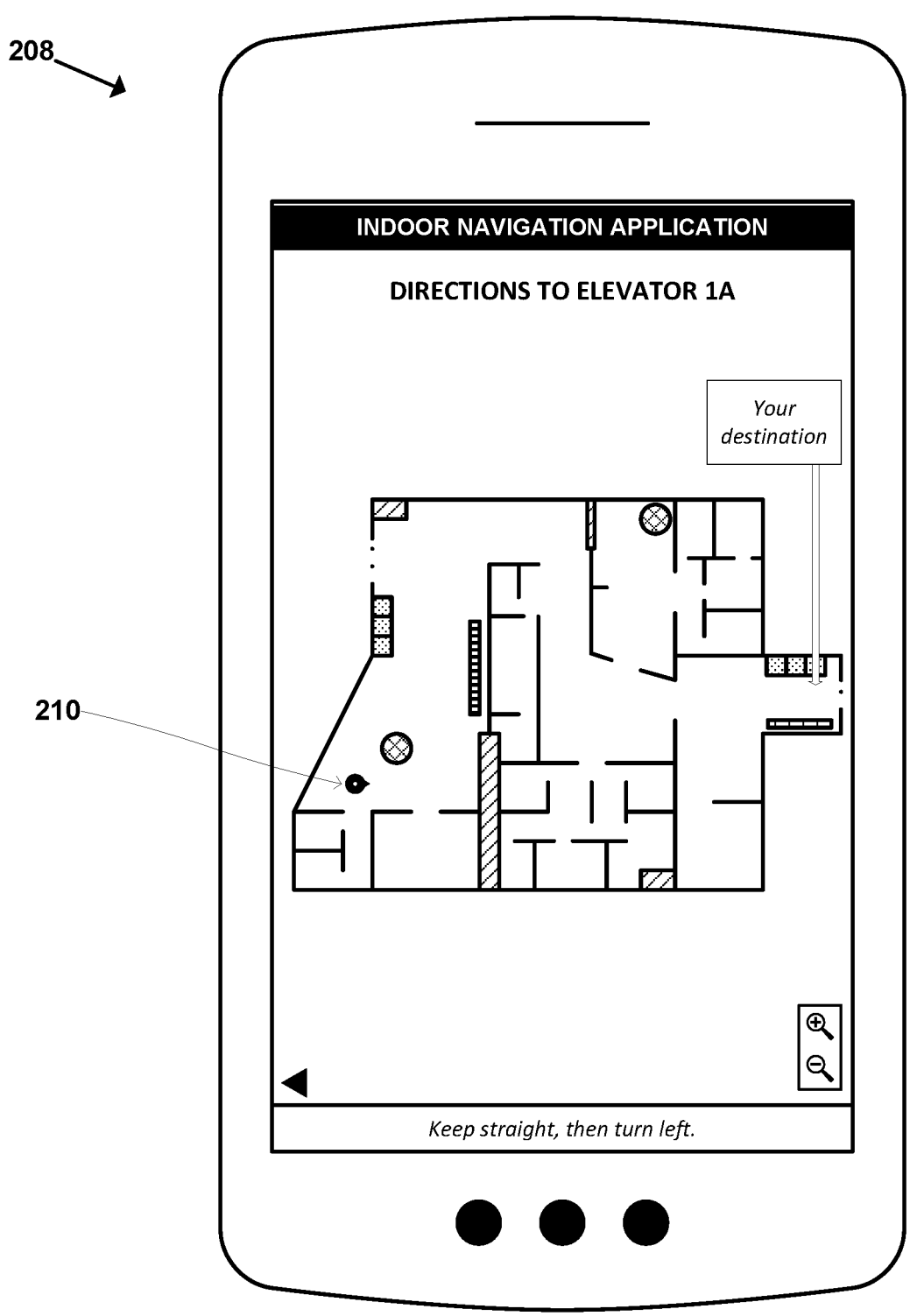
FIG. 2C illustrates an example indoor navigation application, in accordance with an example implementation.

FIGS. 2A to 2C next illustrate an example implementation and use of the above-described positioning solution.

FIG. 2A illustrates an indoor area 200 taking the form of a floor in a building. As shown, several radio devices 204A-204G are positioned throughout the indoor area 200 and several mobile devices 206A-206F are positioned in and/or moving throughout the indoor area 200. Each of the radio devices 204A-204G is shown to respectively emit radio signal(s). Of course, it should be understood that such radio signals are shown for illustration purposes only, and that the illustrated signals do not necessarily indicate coverage, strength, and/or other radio characteristics of those signals. In any case, the mobile devices 206A-206F may each respectively measure the radio signals at issue and then transmit, to a positioning server (e.g., server system 102), fingerprint(s) indicating position estimate(s) and the corresponding radio measurement(s). In turn, the positioning server may generate or update a radio map for the indoor area 200 as described.

FIG. 2B illustrates a mobile device 208 that is positioned in and/or moving through the indoor area 200. The mobile device 208 could be one of the mobile devices 206A-206F that provided fingerprint(s) as described or could be a different mobile device. In either case, the mobile device 208 could observe characteristics of the radio environment at its current position by measuring radio signals emitted by one or more of the radio devices 204A-204G. The mobile device 208 could then refer to the radio map that was generated or updated as described in associated with FIG. 2A, and could determine a position estimate based on the radio characteristics and the radio map as described. Alternatively, the mobile device 208 could transmit, to the positioning server, a request for a position estimate (e.g., a measurement report), which may indicate the observed radio characteristics at issue. In turn, the position server could determine a position estimate based on the radio characteristics and the radio map as described and could then provide the position estimate to the mobile device 208 in response to the request.

FIG. 2C then illustrates how the mobile device 208 could use the position estimate that was determined using the above-described solution. As shown, the mobile device 208 could display an indoor navigation application that includes an open area map of the indoor area 200 as well as a visual indicator 210 of the mobile device 208's position in accordance with the position estimate at issue. Accordingly, the navigation application could use position estimates obtained as described in order to accurately display the current position of the mobile device 208 and/or to help a user of the mobile device 208 accurately navigate through the indoor area 200, among numerous other possibilities. Other illustrations are also possible.

II. Illustrative Methods

As noted above, the present disclosure is directed to an improved approach for making a determination of whether a mobile device is indoors or outdoors.

Generally speaking, the terms indoors, indoor area, indoor space, indoor environment, or the like used herein could refer any physical area/space that is at least partially enclosed, such as, e.g., for purpose of at least partially covering people and/or object(s) (e.g., a building, home, venue, tunnel, etc.) And the terms outdoors, outdoor area, outdoor space, outdoor environment, or the like used herein could refer to any physical areas/spaces other than those that are indoors (e.g., a park, street, intersection, sidewalk, beach, plaza, etc.) Of course, the terms indoors and outdoors or the like can be defined in any feasible manner as understood by one of ordinary skill in the art currently and/or in the future without departing from the scope of the present disclosure.

In any case, as discussed, an entity could make the above-mentioned determination based at least on a distance between the mobile device and a stationary access point to which the mobile device is connected, and on a connection duration representing how long the mobile device has been connected to the access point.

Figure 3:
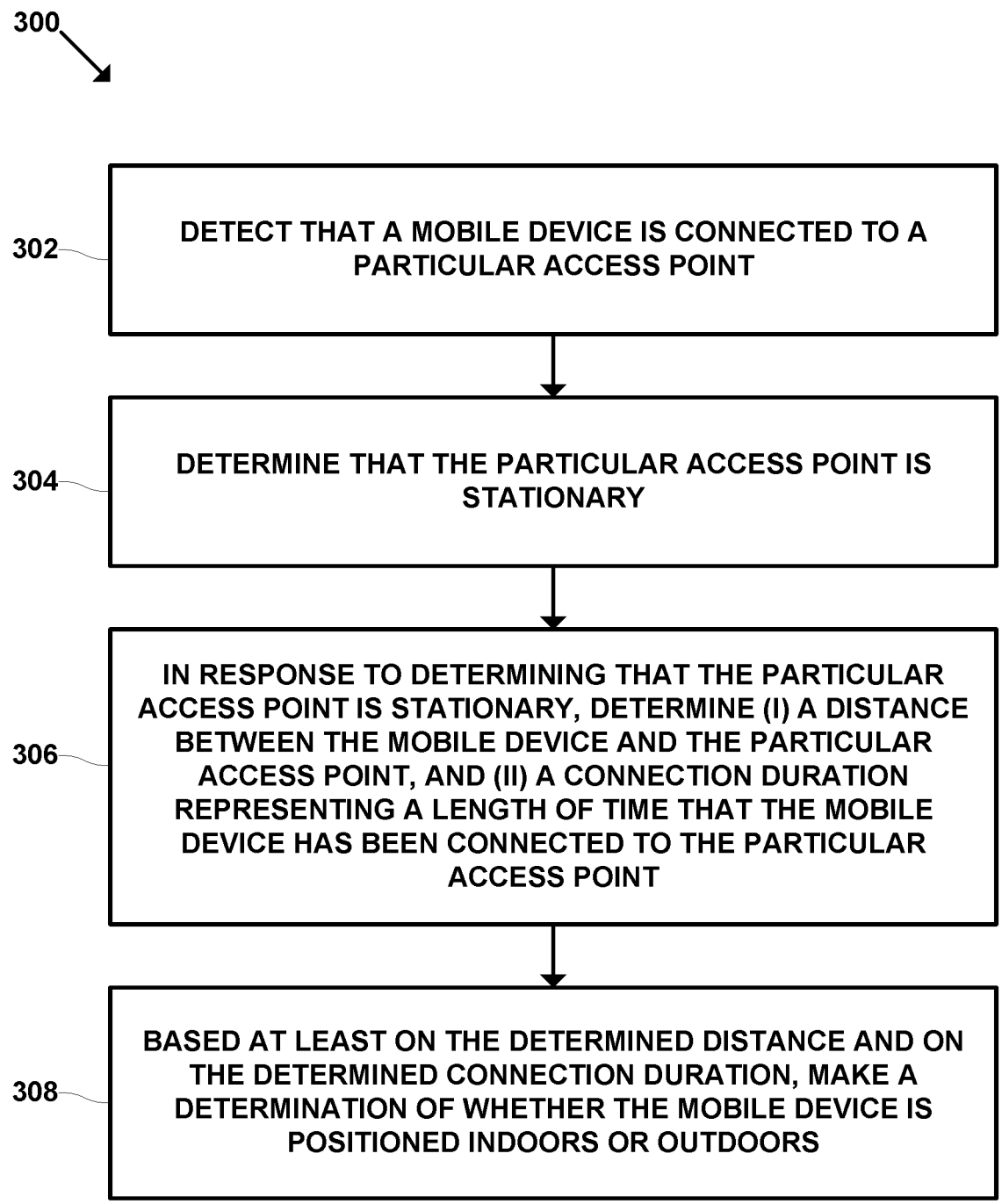
FIG. 3 illustrates an example flowchart for making a determination of whether a mobile device is positioned indoors or outdoors, in accordance with an example implementation.

FIG. 3 is next a flowchart illustrating a method 300 for making a determination of whether a mobile device is indoors or outdoors, in accordance with an example implementation. In practice, method 300 (and other process(es) disclosed herein) could be performed by and/or in an arrangement involving the mobile device (e.g., one of the mobile devices 106) and/or a server device (e.g., server system 102) (or more particularly by component(s)/module(s) (e.g., processor(s)) thereof), among other possibilities. For sake of simplicity, however, method 300 is described herein as being performed by the mobile device and/or the server device.

In this regard, it should be understood that, if the method 300 is performed by a given entity (e.g. a server device), the given entity could engage in communication(s) with one or more other entities (e.g., the mobile device) as necessary to obtain and/or provide any feasible information as understood by one of ordinary skill in the art, to enable the given entity to perform operations described herein and/or to inform another entity about result of the determination, among other possibilities. For example, a server device could perform the method 300 to make the determination at issue, and could then provide, to a mobile device, information indicating results of the determination, or vice versa. Moreover, in some implementations, the various operations described herein could be distributed among one or more entities, such as in accordance with a client-server arrangement or the like. Other arrangements are also possible.

At block 302, method 300 involves detecting that a mobile device is connected to a particular access point. The particular access point could be a Wi-Fi access point or any other radio device with which the mobile device can establish connectivity (e.g., to bridge traffic between the mobile device and other device(s) on a network). Although the present disclosure is described in the context of a Wi-Fi access point, it should be understood that the various aspects of the present disclosure can apply with respect to any type of access point or other radio device.

In practice, the mobile device could engage in communications with the particular (e.g., Wi-Fi) access point as part of a discovery, association, and authentication process in accordance with the IEEE 802.11 standard.

Generally, the mobile device could begin this process by performing a passive or active scan. For example, the mobile device could listen for beacon(s) that are periodically sent by access point(s) to respectively announce their presence. Alternatively, the mobile device may send probe request(s) to discover network(s) within its proximity. One or more access points may receive a probe request from the mobile device, and may each respectively respond by transmitting, to the mobile device, a probe response indicating its presence. In either case, in this step, the mobile device could obtain an identifier of a network (e.g., a service set identifier (SSID)), an identifier of an access point (e.g., a basic server set identifier (BSSID)), and/or other information.

Subsequently, the mobile station may select a network according to certain criteria, and may then transmit, to an access point providing access to the network, an authentication request that contains an identifier of the mobile device (e.g., MAC address), to establish its identity with the access point. The access point may then respond by transmitting, to the mobile device, an authentication response indicating whether authentication of the mobile device is successful.

If authentication of the mobile device is successful, the mobile device may then send, to the access point, an association request to register with the access point in order to gain access to the network. The association request could include, for example, information about the mobile station's capabilities, among other possibilities. In turn, the access point may process the association request to ascertain whether the mobile station's capabilities support parameters defined by the network and/or may perform other operations, so as to determine whether or not the association is successful. If the association is successful, the access point may transmit, to the mobile device, an association response indicating successful association and including a unique association identifier. Once the mobile device receives the successful association response, the mobile device can then transmit and/or receive data over the network via the access point.

Given this, the mobile device could detect connectivity to the particular access point in various ways. For example, the mobile device could detect connectivity to the particular access point in response to or otherwise based on receipt of a beacon, of a probe response, of a successful authentication response, of a successful association response, and/or of an association identifier from the particular access point, among other possibilities.

In some implementations, the mobile device could transmit, to the server device, a message indicating connectivity between the mobile device and the particular access point. The mobile device could do so automatically once the connectivity is established and/or in response to a request from the server device for such information, among other options. Moreover, the message may include the association ID, identifier of the network, identifier of the access point, and/or any other information that may indicate the connectivity at issue. In this way, if the server device carries out method 300, the server device could detect that the mobile device is connected to the particular access point. Other examples are also possible.

At block 304, method 300 involves determining that the particular access point is stationary (e.g., rather than moving).

As an initial matter, the mobile device and/or server device could seek to determine that the particular access point is stationary for various reasons. For example, as noted, a connection duration between the mobile device and an access point being longer may indicate a higher probability of the mobile device being indoors. But if the particular access point is moving, the mobile device's connectivity to the particular access point may be unreliable and thus the connection duration may be relatively short, even if the mobile device is indoors. In another example, as noted, a distance between the mobile device and the access point being shorter may indicate a higher probability of the mobile device being indoors. And as further discussed herein, such a distance can be determined according to signal strength measurement(s). However, measured signal strength is typically fairly sensitive to changes in the environment, so a signal strength-based distance determination may not be reliable if the particular access point is moving or has moved. Thus, determining that the particular access point is stationary may be beneficial for increasing accuracy of the disclosed approach for making a determination of whether the mobile device is indoors or outdoors. Other examples are also possible.

Generally, the mobile device and/or server device could determine that the particular access point is stationary rather than moving in various ways.

For example, the mobile device and/or server device may have stored thereon or otherwise have access to a database that associates access points respectively with an indication of whether the respective access point is stationary or moving. For instance, the database could associate the identifier of each such access point respectively with a binary value (e.g., a zero or one) indicating whether the access point represented by that respective identifier is stationary or moving. Such a database could be established by way of manual engineering input and/or by other techniques currently known and/or developed in the future. In any case, the mobile device and/or server device could use the database to determine that the particular access point is stationary, such as by referring to the binary value associated with an identifier of the particular access point in the database, for instance. Other examples are also possible.

At block 306, method 300 involves, in response to determining that the particular access point is stationary rather than moving, determining (i) a distance between the mobile device and the particular access point, and/or (ii) a connection duration representing a length of time that (e.g., how long) the mobile device has been connected to the particular access point.

Once the mobile device and/or server device confirm that the particular access point is stationary rather than moving, the mobile device and/or server device could responsively proceed to determine the distance and connection duration at issue. Although the present disclosure is described in the context of determining both the distance and connection duration, it should be understood the present disclosure could be carried in the context of determining one or both the distance and connection duration.

In practice, the distance at issue could be determined in various ways. For example, assuming that the particular access point is Wi-Fi Round Trip Time (RTT)-capable, the distance could be determined according to an RTT measurement indicating the length of time it takes for a signal to be sent (e.g., from the mobile device to the access point) in addition to the length of time it takes for an acknowledgement of that signal to be received (e.g., an acknowledgement sent from the access point to the mobile device). In another example, the distance could be determined according to a signal strength measurement by the mobile device (e.g., indicating observed strength of a radio signal emitted by the particular access point), which may correspond to a certain distance between the mobile device and the access point. Other examples are also possible.

Furthermore, the connection duration at issue could also be determined in various ways. For example, once connectivity of the mobile device to the particular access point is detected or established, the mobile device and/or server device could initiate a timer that indicates the connection duration. And the mobile device and/or server device could refer to the timer, so as to determine the connection duration. In another example, the mobile device and/or server device could locally or externally store an indication of a "start" time at which the connectivity at issue was detected or established. And the mobile device and/or server device could then determine the connection duration based on a difference between the start time and a current time. Other examples are also possible.

At block 308, method 300 involves, based at least on the determined distance and/or on the determined connection duration, making a determination of whether the mobile device is positioned indoors or outdoors. Generally, the mobile device and/or server device could make this determination in various ways.

In one example implementation, the mobile device and/or server device could make the determination based on whether the determined distance and/or connection duration respectively meet certain threshold criteria, which may include pre-defined threshold(s) and/or threshold(s) that vary depending on the application (e.g., use case) of making the determination at issue.

In some cases, the mobile device and/or server device could determine that the mobile device is indoors if just one of the determined distance and connection duration meets its respective threshold criteria. For example, the mobile device and/or server device could determine that the mobile device is indoors if the determined distance is shorter than a particular threshold distance, or could determine that the mobile device is outdoors if the determined distance is at or greater than the particular threshold distance. Additionally or alternatively, the mobile device and/or server device could determine that the mobile device is indoors if the determined connection duration is at or longer than a particular threshold duration, or could determine that the mobile device is outdoors if the determined connection duration is shorter than the particular threshold duration. Other examples are also possible.

In other cases, the mobile device and/or server device could determine that the mobile device is indoors if both the determined distance and the connection duration meet their respective threshold criteria. For example, the mobile device and/or server device could determine that the mobile device is indoors only if (i) the determined distance is shorter than the particular threshold distance and (ii) the determined connection duration is at or longer than the particular threshold duration. However, if the determined distance is at or greater than the particular threshold distance and/or the determined connection duration is shorter than the particular threshold duration, then the mobile device and/or server device could determine or otherwise conclude that the mobile device is outdoors. Other examples are also possible.

In another example implementation, the mobile device and/or server device could use the determined distance and the determined connection duration (and possibly other factor(s)) as basis for determining a probability of the mobile device being indoors, and then could then make the above-mentioned determination based on an evaluation of the determined probability.

Generally, the probability determination at issue could be performed computationally in accordance any feasible formula that takes the determined distance and the connection duration (and possibly other factor(s)) into account as input variables and provides the probability at issue as an output variable. In some cases, the formula could be established such that different factors (e.g., the determined distance and the connection duration) are given different respective weights in accordance with the formula. In any case, the formula could be programmatically established via manual engineering input or could be established and/or updated in accordance with machine learning techniques, among other options. Other approaches for establishing the probability determination are possible as well.

As discussed, the determined distance being shorter may indicate a higher likelihood of the mobile device being indoors, and vice versa. And the determined connection duration being longer may indicate a higher likelihood of the mobile device being indoors, and vice versa. Generally speaking, there may be various reasons for such an assessment of how the distance and connection duration impact the likelihood of the mobile device being indoors or outdoors.

For example, a mobile device that is indoors typically remains connected to a Wi-Fi access point (which is typically indoors) for a relatively long duration, and remains sufficiently close to the Wi-Fi access point, so that, for instance, the mobile device has sufficiently strong connectivity to the network (e.g., as often desired by a user on the mobile device). On the other hand, a mobile device that is outdoors is likely of a user on a sidewalk or in a vehicle passing by an indoor area or the like, and thus such a mobile device might briefly connect to the Wi-Fi access point and is likely to remain at a relatively far distance away from the Wi-Fi access point. Other examples are also possible.

Given this, determining the probability of the mobile device being indoors may be performed in accordance with one or more of the following considerations: (i) the determined distance being shorter corresponds to the probability being higher, (ii) the determined distance being greater corresponds to the probability being lower, (iii) the determined connection duration being longer corresponds to the probability being higher, and/or (iv) the determined connection duration being shorter corresponds to the probability being lower. In a more specific example, the above-mentioned formula for determining the probability at issue may be established so as to take such consideration(s) into account. Other examples are also possible.

Once the mobile device and/or server device determine the probability of the mobile device being indoors, the mobile device and/or server device could use the determined probability as basis for classifying the mobile device as being indoors or as being outdoors. For example, the mobile device and/or server device could determine whether the determined probability is at or above a threshold probability (e.g., 80%), which may be pre-defined or may vary depending on the application (e.g., use case) of making the determination at issue (i.e., of whether the mobile device is positioned indoors or outdoors). If the determined probability is at or above the threshold probability, then the mobile device and/or server device may responsively classify the mobile device as being indoors. Whereas, if the determined probability is below the threshold probability, then the mobile device and/or server device may responsively classify the mobile device as being outdoors. In any case, such classifying could involve at least temporarily storing and/or transmitting data that associates the mobile device (e.g., an identifier of the mobile device) with an indication of whether the mobile device is indoors or outdoors, among other options.

In some implementations, the mobile device and/or server device could also take additional factor(s) into account (e.g., other than the determined distance and connection duration) when making the determination of whether the mobile device is positioned indoors or outdoors.

For example, the mobile device and/or server device could make the determination further based on whether GNSS service is currently available to the mobile device. Generally speaking, GNSS is considered to be available to the mobile device if, for instance, the mobile device's is receiving sufficient GNSS signal(s) to enable a position estimation for the mobile device that meets a certain horizontal positioning accuracy. In any case, GNSS service being available to the mobile device may indicate a higher likelihood of the mobile device being outdoors, and GNSS service being unavailable to the mobile device may indicate a higher likelihood of the mobile device being indoors.

Specifically, the mobile device and/or server device could determine the probability of the mobile device being indoors based on the determined distance, on the determined connection duration, and on whether GNSS service is currently available to the mobile device. In this case, determining the probability of the mobile device being indoors may be performed in accordance with one or more of the above-described considerations and in accordance with the following: (i) the GNSS service currently being unavailable to the mobile device corresponds to the probability being higher, and (ii) the GNSS service currently being available to the mobile device corresponds to the probability being lower. Namely, the above-mentioned formula for determining the probability may be established so as to take such additional consideration(s) into account.

Here again, in this example, once the mobile device and/or server device determine the probability of the mobile device being indoors, the mobile device and/or server device could use the determined probability as basis for classifying the mobile device as being indoors or as being outdoors. The mobile device and/or server device could do so as described above.

Figure 4A:
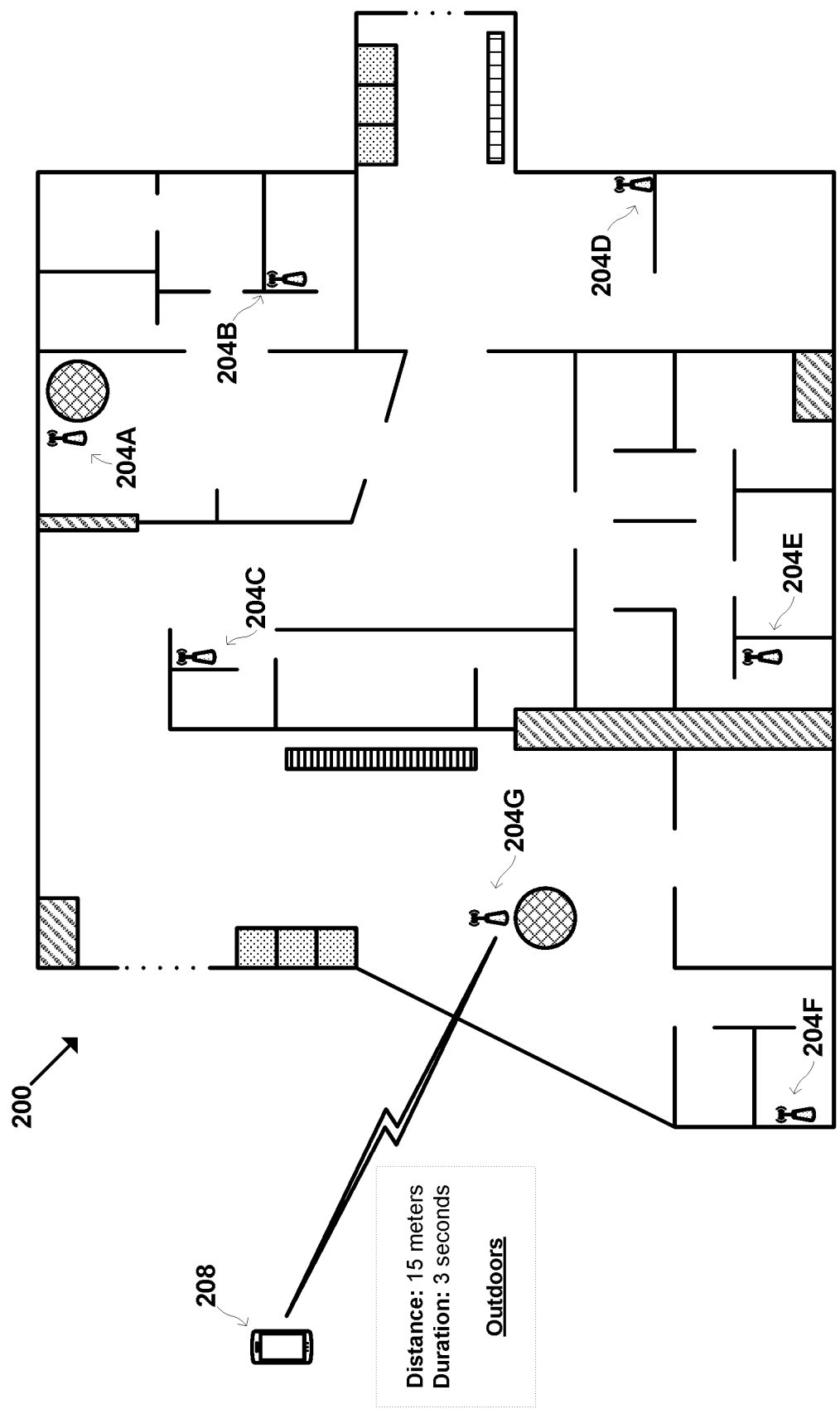
FIG. 4A illustrates a situation in which a determination is made that a mobile device is positioned outdoors, in accordance with an example implementation.
Figure 4B:
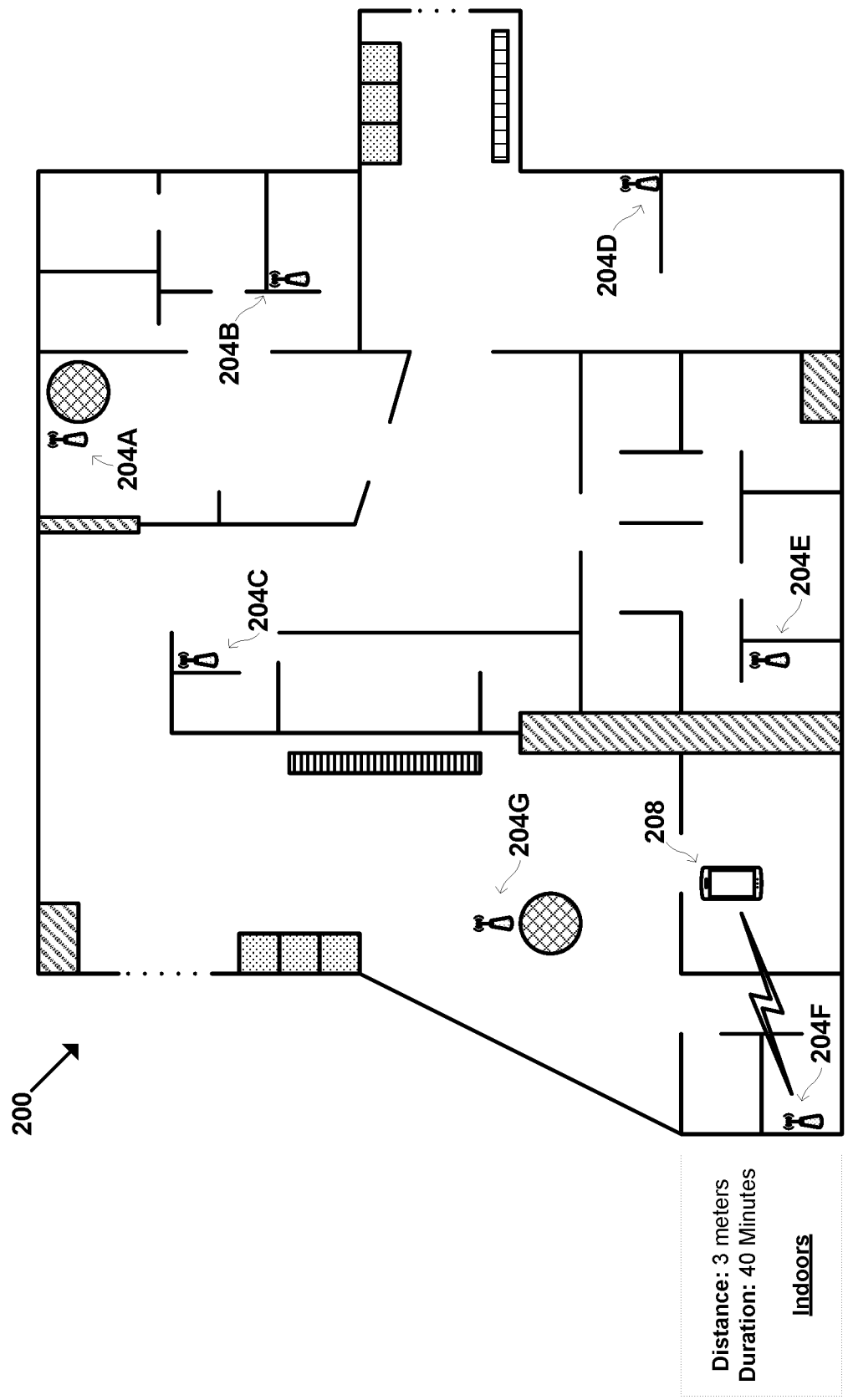
FIG. 4B illustrates a situation in which a determination is made that a mobile device is positioned indoors, in accordance with an example implementation.

FIGS. 4A and 4B next respectively illustrates situations in which the mobile device 208 and/or a server device (not shown) could make a determination of whether the mobile device 208 is positioned indoors (e.g., inside of the indoor area 200) or outdoors (e.g., outside of the indoor area 200). As shown by FIG. 4A, mobile device 208 is fifteen meters away from access point 204G to which it is connected, which is relatively far away. And mobile device 208 has been connected to access point 204G for three seconds, which is a relatively short period of time. Given this, the mobile device 208 and/or a server device could use this distance and duration to make a determination that the mobile device 208 is positioned outdoors. In contrast, as shown by FIG. 4B, mobile device 208 is three meters away from access point 204F to which it is connected, which is relatively close. And mobile device 208 has been connected to access point 204F for forty minutes, which is a relatively long period of time. Given this, the mobile device 208 and/or a server device could use this distance and duration to make a determination that the mobile device 208 is positioned indoors. Other examples and illustrations are also possible.

In line with the discussion above, the mobile device and/or server device could make the determination of whether the mobile device is indoors or outdoors for various reasons.

In one example, the mobile device and/or server device could make the determination at issue so as to detect an outdoor-to-indoor transition or an indoor-to-outdoor transition of the mobile device. For instance, the mobile device and/or server device may have stored thereon or otherwise have access to a previously stored classification indicating the mobile device is outdoors. And if the above-mentioned determination is that the mobile device is indoors, then the mobile device and/or server device could determine that the mobile device transitioned from being outdoors to being indoors in accordance with the previously stored classification.

In another example, the mobile device and/or server device could make the determination at issue as part of verification process. For instance, the mobile device and/or server device could make the determination to verify whether the mobile device is still positioned indoors, such as after already making such a determination over a recent time period. Similarly, the mobile device and/or server device could make the determination to verify whether the mobile device is still positioned outdoors, such as after already making such a determination over a recent time period. In another instance, the mobile device and/or server device could use a different technique to determine whether the mobile device is indoors or outdoors, and could then use the technique disclosed herein to verify results of the different technique.

In yet another example, the mobile device and/or server device could provide a notification associated with the above-mentioned determination. For instance, the notification could be provided to any feasible entity, so that the entity could rely on the notification for any feasible use case, such as those related to security application(s), advertising application(s), asset tracking, among others. In a more specific examples, the notification could be provided to the mobile device (e.g., if the server device carries out the disclosed technique), to the server device (e.g., if the mobile device carries out the disclosed technique), to another computing device, and/or to an application that is running on the mobile device, the server device, or the other computing device, among other options. In any case, the notification could indicate whether the mobile device is indoors or outdoors according to the above-mentioned determination, could indicate an indoor-to-outdoor transition of the mobile device, could indicate an outdoor-to-indoor transition of the mobile device, and/or could provide verification or lack thereof as part of a verification process as described, among other possibilities.

In some implementations, the above-mentioned determination could serve as basis to for the mobile device and/or server device to trigger or otherwise initiate one or more other processes, especially if the determination is that the mobile device is positioned indoors.

For example, the mobile device and/or server device could response to a determination that the mobile device is indoors by triggering an indoor-positioning process to determine an indoor position of the mobile device, which may enable indoor positioning, tracking, and/or navigation as described. For instance, the indoor-positioning process could be in line with the above-described positioning solution in which the indoor position of the mobile device is determined based at least on radio measurements by the mobile device and a radio map associated with the indoor space at which the mobile device is located. In another instance, the indoor-positioning process at issue may be a dead-reckoning process, which may involve determining the mobile device's current position based on a previously determined position (e.g., in an outdoor area before detection of an outdoor-to-indoor transition by the mobile device) and on information from various sensor(s) (e.g., collected indoors after detection of the outdoor-to-indoor transition).

In another example, the mobile device and/or server device could respond to a determination that the mobile device is indoors by causing the mobile device to engage in the above-described crowd-sourcing process, which may involve generating, collecting and/or providing fingerprint(s). As described, such a crowd-sourcing process may enable generation or updating of a radio map associated with the indoor space at which the mobile device is located.

In yet another example, the mobile device and/or server device could respond to a determination that the mobile device is indoor by causing the mobile device to at least temporarily disable, discard, and/or filter out GNSS measurements while the mobile device is positioned indoors. Since GNSS is typically unavailable or unreliable indoors, it may be beneficial to disable, discard, and/or filter out GNSS measurements while the mobile device is positioned indoors, because doing so may help decrease power consumption by the mobile device and/or may help avoid an inaccurate GNSS-based position estimate, among other advantages. Other examples are also possible.

In a further aspect, disclosed herein is an approach for using machine learning to enable use of (e.g., radio) measurement(s) to determine whether a mobile device is indoors or outdoors.

In particular, any of the techniques described herein can be used to make a determination of whether a mobile device is indoors or outdoors when a mobile device generates and/or provides a fingerprint to a positioning server during the crowd-sourcing process described above, such that the fingerprint can in turn be labeled as indoors or outdoors in accordance with the determination. Given this, a plurality of fingerprints from mobile device(s) can be labeled in this manner during the crowd-sourcing process, so as to generate training data that includes indoor or outdoors labels respectively for the plurality of fingerprints. One or more currently known and/or future-developed machine learning algorithms can then be applied to use this training data as basis for generating a model or the like that indicates which (e.g., radio) measurement(s) (e.g., RSS values and/or associated radio device identifier(s) included in labeled fingerprint(s)) tend to correspond to an indoor position and which measurement(s) tend to correspond to an outdoor position. Such a model could be incorporated into a radio map or could otherwise be made available to mobile device(s), server device(s), and/or other entities. In either case, when a mobile device provides or otherwise has measurement(s) (e.g., in a measurement report for positioning purposes), the generated model can be used to determine whether those measurement(s) indicate that the mobile device is indoors or outdoors.

In yet a further aspect, also disclosed herein is an approach for determining whether a (e.g., Wi-Fi) access point provides connectivity to a private network (e.g., a home network) or to a public network (e.g., a network available in a café, workplace, shop, or the like). To do so, a server device and/or a mobile device could determine a count of how many devices are currently connected to the particular access point and/or have connected to the particular access point over a certain time period. Based at least on the determined count, the server device and/or mobile device could determine whether the particular access point provides connectivity to a private network or to a public network.

For example, a private network tends to have few users and the number of connected users is typically substantially constant. Whereas, a public network tends to have many users and the user set tends to steadily expand over time. Given this, if the determined count is at or above a threshold count, then the particular access point can be labeled as providing connectivity to a public network. Whereas, if the determined count is below the threshold count, then the particular access point can be labeled as providing connectivity to a private network. Additionally or alternatively, if the determined count (e.g., number of user that are connected or have connected to the access point) significantly increases over time (e.g., by a certain percentage or number), then the particular access point can be labeled as providing connectivity to a public network. Whereas, if the determined count remains substantially the same over time (e.g., only a few (e.g., two) new users connect to the particular access point over a given year), then the particular access point can be labeled as providing connectivity to a private network. Other examples are also possible.

III. Example Hardware and Software

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
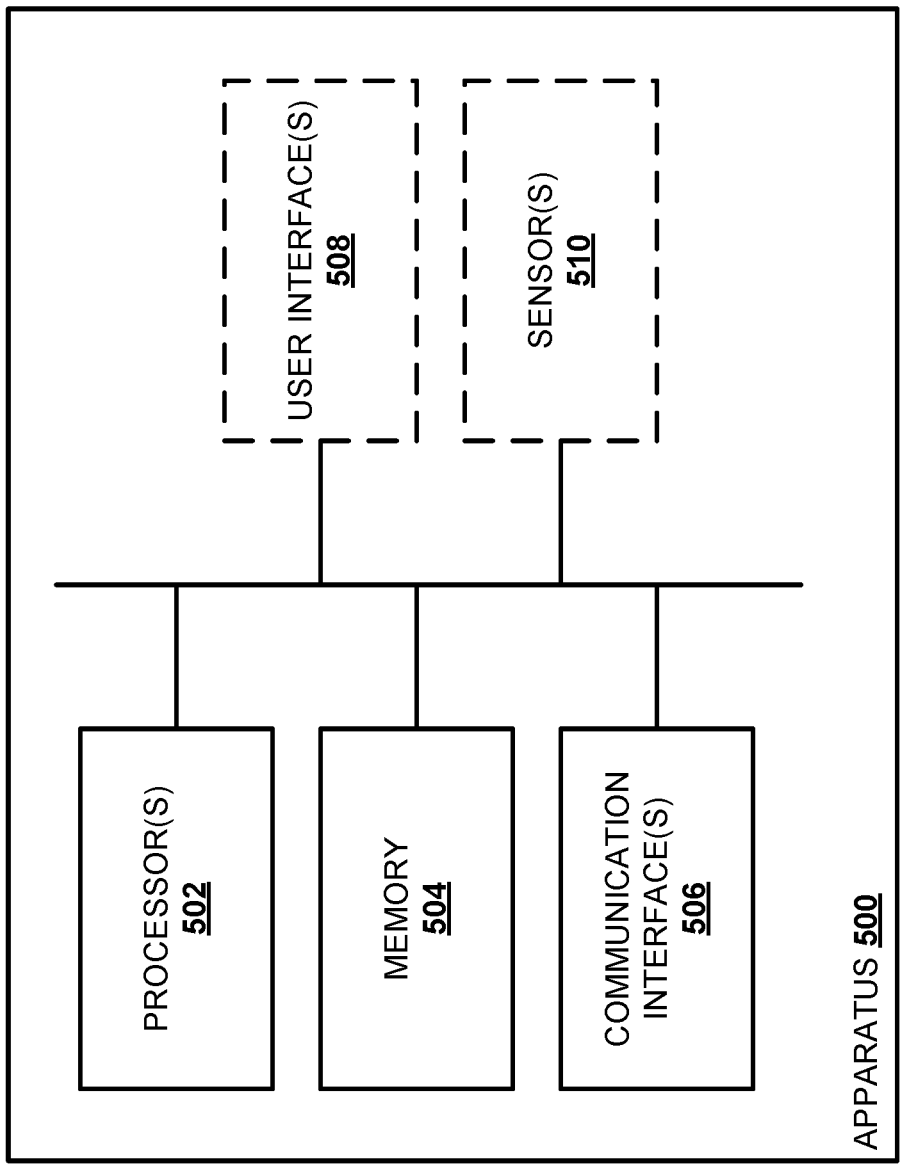
FIG. 5 illustrates an example apparatus, in accordance with an example implementation.

FIG. 5 is a schematic block diagram of an apparatus 500 according to an example embodiment. The apparatus 500 could, for instance, represent a server (e.g., server system 102) or a mobile device (e.g., one of the mobile devices 106), among other options. Moreover, the apparatus 500 could take the form of or otherwise be part of a system, such as any of those described herein.

As shown, apparatus 500 could include processor(s) 502, a memory 504 (e.g., database 108), communication interface(s) 506, an (optional) user interface(s) 508, and (optional) sensor(s) 510. Some or all of the components of the apparatus 500 may be connected via a bus (or other mechanism) and/or be combined into one or more modules.

Processor(s) 502 could have numerous functions, such as controlling the memory 504, communication interface(s) 506, the user interface(s) 508, and/or the sensor(s) 510 in any feasible manner currently known or developed in the future. For example, the memory 504 could include or otherwise contain computer program code (program instructions), and the processor(s) 502 may be configured to execute the program code to cause the apparatus 500 to perform and/or control operations, such as any of those described herein and/or other operations. Thus, apparatus 500 and/or processor(s) 502 could be referred to as carrying out such operations.

Moreover, processor(s) 502 (and also any other processor(s) mentioned herein) may be processor(s) of any suitable type. For example (and without limitation), processor(s) 502 may include: one or more microprocessor(s), one or more processor(s) with accompanying one or more digital signal processor(s), one or more processor(s) without accompanying digital signal processor(s), one or more special-purpose computer chips, one or more FPGA(s), one or more controller(s), one or more ASIC(s), one or more computer(s), any structure/hardware that has been programmed in such a way to perform described operation(s), and/or an application processor that runs an operating system, among other possibilities.

Furthermore, memory 504 could also take various form without departing from the scope of the present disclosure. In particular, memory 504 could be separate from processor(s) 502. Additionally or alternatively, memory 504 may be part of or otherwise integrated with one or more of the processor(s) 502. In this case, memory 504 may be fixed to the from processor(s) 502 or may be at least partially removable from the processor(s) 502. In any case, the memory 504 be or take the form of volatile and/or non-volatile memory, and could include program memory, working memory, and/or data memory, among others.

By way of example (and without limitation), memory 504 could be or otherwise include: FLASH memory (or a part thereof), any of a Read-Only Memory (ROM), PROM, EPROM and EEPROM memory (or a part thereof), a hard disc (or a part thereof), a Random Access Memory (RAM), and/or Dynamic RAM (DRAM), among others. In some cases, memory 504 may additionally or alternatively include an operating system for processor(s) 502 and/or firmware for apparatus 500. Further, memory 504 could additionally or alternatively be used by processor(s) 502 when executing an operating system and/or computer program. Moreover, memory 504 could additionally or alternatively store data, such as any types, sets, instances, and/or samples of data described herein. Other examples are also possible.

Further, communication interface(s) 506 could enable the apparatus 500 to communicate with other entities. The communication interface(s) 506 may, for instance, include a wireless interface (e.g. a cellular radio communication interface and/or a WLAN interface) and/or wire-bound interface (e.g. an IP-based interface, for instance to communicate with entities via the Internet).

Yet further, user interface(s) 508 could be any device(s) for presenting and/or receiving information. For instance, user interface(s) 508 include display device(s), audio device(s) or the like for visually and/or audibly providing information (e.g., to a user). Additionally or alternatively, user interface(s) 508 could include input device(s) (e.g. a keyboard, keypad, touchpad, mouse, etc.) for receiving information (e.g., based on input provided by a user).

Finally, sensor(s) 510 could include any type(s) of sensor(s) currently known and/or developed in the future. For example, sensor(s) 510 could include a barometric sensor (e.g., to gather pressure information), motion sensor(s) (e.g., inertial measurement unit (IMU)), image capture device(s), position sensor(s), Global Navigation Satellite System (GNSS) receiver(s) (e.g., in the form of a Global Positioning System (GPS) receiver), and/or any (currently known and/or future-developed) sensor(s) that enable the apparatus 500 to perform radio measurements (e.g., Bluetooth and/or Wi-Fi receiver(s)), among other possibilities.

In a further aspect, the term "computer-readable medium" as used herein may refer to any medium that participates in providing information to processor(s), including instructions for execution. Such a medium may take many forms, including, but not limited to computer-readable storage medium (e.g., non-volatile media, volatile media), and/or transmission media. Non-transitory media, such as non-volatile media, may include, for example, optical or magnetic disks, such as storage device. Volatile media may include, for example, a dynamic memory.

Transmission media may include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media.

Generally speaking, common forms of computer-readable media may include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read.

In some cases, the term computer-readable storage medium may be used herein to refer to any computer-readable medium except transmission media. Further, logic encoded in one or more tangible media may includes processor instructions on a computer-readable storage media and/or special purpose hardware (e.g., ASIC).

In practice, a computer-readable storage medium could have stored thereon instructions executable by processor(s) to cause an apparatus to perform operations, such as any of those described herein. Accordingly, a computer program could be stored in a computer readable storage medium in the form of instructions encoding the computer readable storage medium. The computer-readable storage medium may be intended for taking part in the operation of a device, like an internal or external memory or hard disk of a computer, or be intended for distribution of the program, like an optical disc, among other options.

IV. Example Geographic Database

Figure 6:
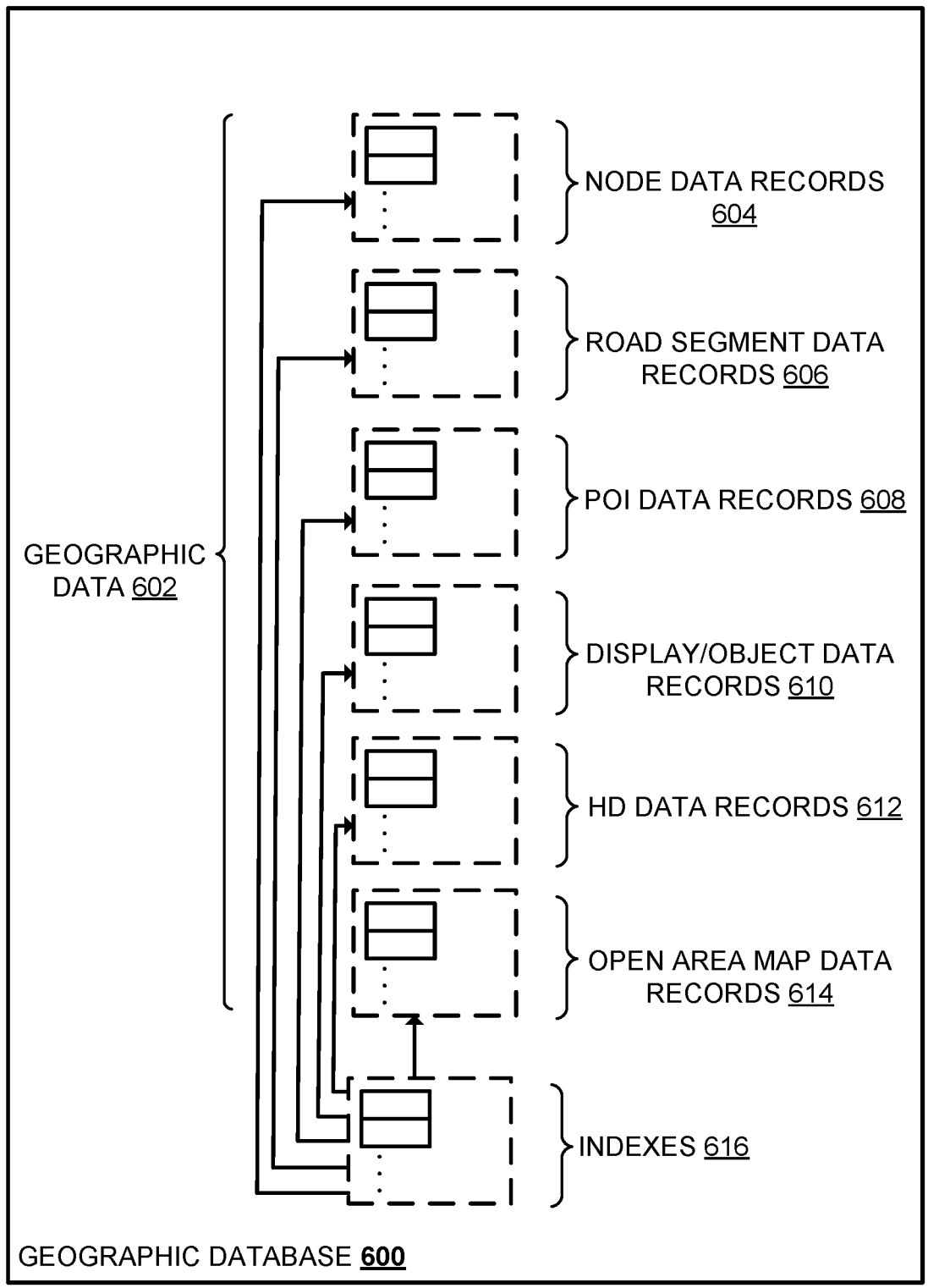
FIG. 6 illustrates a diagram of a geographic database, in accordance with an example implementation.

FIG. 6 illustrates a diagram of a geographic database 600, according to an example implementation. Geographic database 600 could be included within, integrated with, or be separate from another database, data storage device, memory, or the like described herein (e.g., memory 504). Additionally or alternatively, geographic database 600 could be stored on or otherwise made accessible to any entity described herein without departing from the scope of the present disclosure. Moreover, although certain aspects of the geographic database are described in the context of outdoor mapping and/or navigation-related services, it should be understand that some or all such aspects could extend to apply in the context of indoor mapping and/or navigation-related services.

More specifically, the geographic database 600 may include geographic data 602 used for (or configured to be compiled to be used for) mapping and/or navigation-related services. For instance, the geographic database 600 may include high resolution or high definition (HD) mapping data that provide centimeter-level or better accuracy of map features. By way of example, the geographic database 600 can be based at least in part on Light Detection and Ranging (LiDAR) and/or other technology to collect billions of 3D points and model road surfaces (and/or other map features down), e.g., to the number lanes and their widths. In some cases, the HD mapping data (e.g., HD data records 612) may capture and store details such as the slope and curvature of the road, lane markings, roadside objects such as sign posts, including what the signage denotes, and/or shape/sizes of indoor objects, hallways, rooms etc. In practice, the HD mapping data may enable precise localization of an entity on a road and/or in a building, and/or may enable determination of map data updates (e.g., learned speed limit values) to at high accuracy levels, among other options.

In the geographic database 600, geographic features (e.g., two-dimensional or three-dimensional features) may be represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In this regard, the following terminology may apply to the representation of geographic features in the geographic database 600.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In an example implementation, the geographic database 600 may follow certain conventions. For example, links might not cross themselves and might not cross each other except at a node. Also, there may be no duplicated shape points, nodes, or links. Two links that connect each other may have a common node. In the geographic database 600, overlapping geographic features may be represented by overlapping polygons. When polygons overlap, the boundary of one polygon may cross the boundary of the other polygon. In the geographic database 600, the location at which the boundary of one polygon intersects the boundary of another polygon may be represented by a node. In an embodiment, a node may be used to represent other locations along the boundary of a polygon than a location at which the boundary of the polygon intersects the boundary of another polygon. Additionally or alternatively, a shape point may not be used to represent a point at which the boundary of a polygon intersects the boundary of another polygon.

In an example implementation, the geographic database 600 may be stored as a hierarchical or multi-level tile-based projection or structure. More specifically, in one embodiment, the geographic database 600 may be defined according to a normalized Mercator projection. Other projections may be used. By way of example, the map tile grid of a Mercator or similar projection may be a multilevel grid. Each cell or tile in a level of the map tile grid may be divisible into the same number of tiles of that same level of grid. In other words, the initial level of the map tile grid (e.g., a level at the lowest zoom level) may be divisible into four cells or rectangles. Each of those cells are in turn divisible into four cells, and so on until the highest zoom or resolution level of the projection is reached.

In some implementations, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. Further, each cell may be divided into four rectangles and numbered by concatenating the parent tile ID and the new tile position. A variety of numbering schemes also is possible. Any number of levels with increasingly smaller geographic areas may represent the map tile grid. Any level (n) of the map tile grid may have 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In this regard, a system may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In an embodiment, the quadkey is an example of the hash or encoding scheme of the respective geographical coordinates of a geographical data point that can be used to identify a tile in which the geographical data point is located.

As shown, the geographic database 600 may include node data records 604, road segment or link data records 606, Points of Interest (POI) data records 608, display/object data records 610, HD mapping data records 612, open area map data records 614, and indexes 616, for example. More, fewer or different data records can be provided. For example, other data records can include cartographic data records, routing data, and/or maneuver data. Further, the indexes 616 may improve the speed of data retrieval operations in the geographic database 600. For instance, the indexes 616 may be used to quickly locate data without having to search every row in the geographic database 600 every time it is accessed. For example, in one embodiment, the indexes 616 can be a spatial index of the polygon points associated with stored feature polygons.

In exemplary embodiments, the road segment data records 606 may be links or segments representing roads, streets, or paths, as can be used in a calculated or recorded route information for determination of one or more personalized routes. The node data records 604 may be end points corresponding to the respective links or segments of the road segment data records 606. The road link data records 606 and the node data records 604 may represent a road network, such as used by vehicles, cars, and/or other entities. Alternatively, the geographic database 600 can contain path segment(s) and node data records or other data that represent pedestrian paths or areas in addition to or instead of the vehicle road record data (e.g., paths and/or areas for indoor and/or outdoor positioning and/or navigation), for example.

The road/link segments and nodes can be associated with attributes, such as geographic coordinates, street names, address ranges, speed limits, turn restrictions at intersections, and other navigation related attributes, room names/identifiers, vertical connector names/identifiers, as well as POIs, such as gasoline stations, hotels, restaurants, museums, stadiums, offices, automobile dealerships, auto repair shops, buildings, stores, parks, interior building features etc. The geographic database 600 can include data about the POIs and their respective locations in the POI data records 608. The geographic database 600 can also include data about places, such as cities, towns, or other communities, and other geographic features, such as bodies of water, mountain ranges, etc. Such place or feature data can be part of the POI data records 608 or can be associated with POIs or POI data records 608 (such as a data point used for displaying or representing a position of a city). Other examples are also possible.

In some implementations, the geographic database 600 can include display/object data records 610 for storing machine-readable visual representations and map data decoded from the visual representations and their respective properties. In addition, the display/object data records 610 can store post-processing rule sets for correcting and/or reducing the uncertainties in the display/object data decoded from clustered machine-readable visual representations. The display/object data records 600 can also store data selection rules (e.g., in a map data extension layer) for selecting from among multiple sets of readings of a machine-readable visual representation. The display/object data records 600 can also store confidence or accuracy determinations for the decoded map data. By way of example, the display/object data records 600 can be associated with one or more of the node records 604, road segment records 606, and/or POI data records 608 to support uses cases such as enhanced mapping user interfaces (UIs), autonomous driving, dynamic map updates, etc. In some cases, the display/object data records 610 may be stored as a data layer of the hierarchical tile-based structure of the geographic database 600 according to the various embodiments described herein.

In some implementations, as discussed above, the HD mapping data records 612 could model map features to centimeter-level or better accuracy. The HD mapping data records 911 may be divided into spatial partitions of varying sizes to provide HD mapping data to vehicles and/or other devices with near real-time speed without overloading the available resources of the vehicles and/or devices (e.g., computational, memory, bandwidth, etc. resources).

In an example implementation, the geographic database 600 can be maintained by a content provider in association with a services platform (e.g., a map developer). The map developer can collect geographic data to generate and/or enhance the geographic database 600. There can be different ways used by the map developer to collect data. These ways can include obtaining data from other sources, such as municipalities or respective geographic authorities. Additionally or alternatively, the map developer can employ field personnel to travel along roads and/or inside buildings (or other indoor areas) throughout the geographic region to observe features and/or record information about them, for example. Additionally or alternatively, remote sensing, such as aerial or satellite photography, can be used.

Generally, the geographic database 600 can be a master geographic database stored in a format that facilitates updating, maintenance, and/or development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data can be compiled (such as into a platform specification format (PSF)) to organize and/or configure the data for performing navigation-related functions and/or services, such as route calculation, route guidance, map display, speed calculation, distance and travel time functions, and other functions, by a navigation or other device. The navigation-related functions can correspond to vehicle navigation, pedestrian navigation, or other types of navigation. The compilation to produce end user databases can be performed by a party or entity separate from the map developer. For instance, a customer of the map developer, such as a navigation device or other end user device developer, can perform compilation on a received geographic database in a delivery format to produce one or more compiled navigation databases.

In a further aspect, as noted, the geographic database 600 could additionally or alternatively include open area map data record(s) 614 for open area map(s). Generally speaking, open area map(s) may include image(s) or the like of respective layout(s) representing pedestrian walkable area(s) (e.g., indoor area(s), such as one or more floors of a building), and may be configured, separately or together, to enable or otherwise provide point-to-point routing within the layout(s). For example, in line with the discussion above, a radio map could include, be combined with, or otherwise correspond to an open area map representing features of an indoor and/or outdoor area at various locations in the area, to enable positioning and/or navigation solution(s) for the area. Other examples are also possible.

In an example implementation, an open area map may be positioned in, on, or over a geographic map or database (e.g., geographic database 600). The geographic map may be or include geographic data (e.g., any feasible data from records 604-612) corresponding to an area other than (or perhaps at least partially overlapping with) the area represented in the open area map. Also, the geographic map may represent compiled data that corresponds to a database or map configured for vehicle and/or pedestrian navigation. Alternatively, the geographic map may correspond to any real-world or geographic map or data that may or may not be used for navigation or routing. In any case, the geographic map may, e.g., include, but is not limited to, a road network. The road network may represent real-world roads or paths, such as in a city or other geographic region. Navigation attributes and POIs may also be provided.

In this regard, the open area map may be associated or linked with the geographic map or data. For example, one or more points or coordinates of the open area map may be aligned or positioned in or with one or more points or coordinates of the geographic map or data. In one embodiment, coordinates corresponding to tiles, objects, or other portion of the open area map may be in, translated to, or converted to real-world coordinates, such as longitude or latitude, Universal Transverse Mercator ("UTM") coordinates, or other rectangular or 3D coordinates, such as altitude or elevation points. Based on the real-world coordinates, the open area map or data thereof may be placed, positioned, or aligned with or within the geographic map.

For example, nodes, segments, or other features of the geographic map may correspond to real-world coordinates, such as longitude, latitude, and/or UTM coordinates as well as elevation or altitude information. Accordingly, by knowing the real-world coordinates of the open area map, the open area map may be accurately linked to a real-world position or location in the geographic map (e.g., geographic database 600 and/or a display). Additionally or alternatively, the coordinates or points of the open area map or data thereof may be linked or associated with a road network, such as road segments, nodes, and/or other features, without reference to real-world coordinates.

Given this, an end user may perform point-to-point routing using the open area map while viewing a surrounding geographic area or map. Also, the open area map may be linked to the geographic map for navigation or routing purposes, such as via point or navigation data.

For example, an end user may want to navigate or route from inside the open area map to a point external to the open area map that is covered in the geographic map, or vice versa (e.g., an indoor-to-outdoor transition and/or an outdoor-to-indoor transition). Accordingly, a route may be calculated and/or displayed in the open area map (e.g., in the context of indoor navigation), and then from a transition point or area, the route or second route (a continuing route to a selected destination outside of the open area map) may be calculated and/or displayed based on route calculation of the geographic map.

In this regard, in some cases, the navigation or routing of the geographic map may be different than the point-to-point routing of the open area map. For example, the routing of the geographic map may be based on vehicle and/or pedestrian navigation attributes of set roadways, and the routing of the open area map may be based on pedestrian navigation attributes of set indoor features (e.g., hallways, lobbies, rooms etc.) But in other cases, the navigation or routing of the geographic map could be the same as or similar to the point-to-point routing of the open area map.

In any case, in other implementations, an open area map may be positioned in or associated with the geographic map without being linked or tied in with navigation or routing features or functions of the geographic map. Namely, the routing or navigation of at least some open area map(s) may be independent or separate from routing or navigation of an associated geographic map. Other examples and aspects are also possible.

V. Conclusion

Any connection described herein is to be understood in a way that the involved components are operationally coupled. Thus, the connection(s) can be direct or indirect with any number or combination of intervening elements, and there may be merely a functional relationship between the components.

Moreover, any of the methods, processes and actions described or illustrated herein may be implemented using executable instructions in a general-purpose or special-purpose processor(s) and stored on a computer-readable storage medium (e.g., disk, memory, or the like) to be executed by such processor(s).

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the disclosure on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The present disclosure has been described by means of example embodiments. It should be noted that there are alternative ways and variations which are obvious to a skilled person in the art and can be implemented without deviating from the scope of the present disclosure.

Many modifications and other embodiments of the present disclosure set forth herein will come to mind to one skilled in the art to which the present disclosure pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the present disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the present disclosure. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method for avoiding a false detection that a mobile device is positioned indoors when making a determination of whether the mobile device is positioned indoors or outdoors, the false detection being due to outdoor connectivity to a particular access point that is positioned indoors, the method comprising:
   determining, by the one or more processors, that the particular access point is stationary;
   in response to determining that the particular access point is stationary, determining, by the one or more processors, (i) a distance between the mobile device and the particular access point, and (ii) a connection duration representing a length of time that the mobile device has been connected to the particular access point; and
   the one or more processors making the determination while avoiding the false detection by determining a probability of the mobile device being indoors based at least on the determined distance and on the determined connection duration, rather than based on connectivity to the particular access point, wherein determining the probability of the mobile device being indoors is in accordance with the following: (i) the determined distance being shorter corresponds to the probability being higher, (ii) the determined distance being greater corresponds to the probability being lower, (iii) the determined connection duration being longer corresponds to the probability being higher, and (iv) the determined connection duration being shorter corresponds to the probability being lower.

2. The method of claim 1,
   wherein the one or more processors have access to a database that associates each respective access point, of a plurality of access points, with an indication of whether the respective access point is one of stationary or moving, and
   wherein the one or more processors use the database as basis to determine that the particular access point is stationary.

3. The method of claim 1,
   wherein the one or more processors have access to a previously stored classification indicating that the mobile device is outdoors, and
   wherein the determination being that the mobile device is positioned indoors corresponds to the determination being that the mobile device transitioned from being outdoors to being indoors in accordance with the previously stored classification.

4. The method of claim 1, wherein making the determination comprises:
   classifying the mobile device as being indoors or as being outdoors based on the determined probability.

5. The method of claim 4, wherein classifying based on the determined probability of the mobile device being indoors comprises:
   determining whether the determined probability is at or above a threshold probability;
   if the determined probability is at or above the threshold probability, then responsively classifying the mobile device as being indoors; and
   if the determined probability is below the threshold probability, then responsively classifying the mobile device as being outdoors.

6. The method of claim 1, wherein the mobile device is configured to receive Global Navigation Satellite System (GNSS) service, the method further comprising:
   determining, by the one or more processors, whether the GNSS service is currently available to the mobile device, and
   wherein making the determination is further based on whether the GNSS service is currently available to the mobile device.

7. The method of claim 6, wherein making the determination comprises:
   determining the probability of the mobile device being indoors further based at least on whether the GNSS service is currently available to the mobile device; and
   classifying the mobile device as being indoors or as being outdoors based on the determined probability, and
   wherein determining the probability of the mobile device being indoors is further in accordance with the following: (i) the GNSS service currently being unavailable to the mobile device corresponds to the probability being higher, and (ii) the GNSS service currently being available to the mobile device corresponds to the probability being lower.

8. The method of claim 1, further comprising:
in response to the determination being that the mobile device is positioned indoors, triggering, by the one or more processors, an indoor-positioning process to determine an indoor position of the mobile device within an indoor space.

9. The method of claim 8, wherein the indoor-positioning process comprises determining the indoor position based at least on (i) radio measurements by the mobile device within the indoor space and (ii) a radio map associated with the indoor space.

10. The method of claim 8, wherein indoor-positioning process comprises a dead reckoning process.

11. The method of claim 1, further comprising:
in response to the determination being that the mobile device is positioned indoors, causing, by the one or more processors, the mobile device to collect at least radio measurements in an indoor space, the collected radio measurements to be used for generating or updating of a crowdsourced radio map.

12. The method of claim 1, wherein the mobile device is configured to receive Global Navigation Satellite System (GNSS) service, the method further comprising:
in response to the determination being that the mobile device is positioned indoors, causing, by the one or more processors, the mobile device to at least temporarily disable, discard, or filter out GNSS measurements while the mobile device is positioned indoors.

13. The method of claim 1, further comprising:
providing, by the one or more processors, a notification to one or more of the following: (i) the mobile device, (ii) a server device, (iii) another computing device, or (iv) an application that is running on the mobile device, the server device, or the other computing device,
wherein the notification indicates whether the mobile device is positioned indoors or outdoors in accordance with the determination.

14. The method of claim 1, further comprising:
determining, by the one or more processors, a count of how many devices are connected to the particular access point; and
based at least on the determined count, determining, by the one or more processors, whether the particular access point provides connectivity to a private network or to a public network.

15. The method of claim 1, wherein the particular access point is a Wi-Fi access point.

16. An apparatus comprising:
one or more processors;
a non-transitory computer readable medium; and
program instructions stored on the non-transitory computer readable medium and executable by the one or more processors to:
determine that a particular access point is stationary, wherein the particular access point is positioned indoors;
in response to determining that the particular access point is stationary, determine (i) a distance between the mobile device and the particular access point, and (ii) a connection duration representing a length of time that the mobile device has been connected to the particular access point; and
make a determination of whether the mobile device is positioned indoors or outdoors while reducing risk of a false detection, due to outdoor connectivity to the particular access point that is positioned indoors, that the mobile device is positioned indoors,
wherein making the determination is performed by determining a probability of the mobile device being indoors based at least on the determined distance and on the determined connection duration, rather than based on connectivity to the particular access point, and wherein determining the probability of the mobile device being indoors is in accordance with the following: (i) the determined distance being shorter corresponds to the probability being higher, (ii) the determined distance being greater corresponds to the probability being lower, (iii) the determined connection duration being longer corresponds to the probability being higher, and (iv) the determined connection duration being shorter corresponds to the probability being lower.

17. The apparatus of claim 16, wherein making the determination comprises:
classifying the mobile device as being indoors or as being outdoors based on the determined probability.

18. A non-transitory computer readable medium having stored thereon instructions executable by one or more processors to cause a mobile device or a server device to perform operations for avoiding a false detection that the mobile device is positioned indoors when making a determination of whether the mobile device is positioned indoors or outdoors, the false detection being due to outdoor connectivity to a particular access point that is positioned indoors, the operations comprising:
determining (i) a distance between the mobile device and the particular access point, and (ii) a connection duration representing a length of time that the mobile device has been connected to the particular access point; and
making the determination while avoiding the false detection by determining a probability of the mobile device being indoors based at least on the determined distance and on the determined connection duration, rather than based on connectivity to the particular access point, wherein determining the probability of the mobile device being indoors is in accordance with the following: (i) the determined distance being shorter corresponds to the probability being higher, (ii) the determined distance being greater corresponds to the probability being lower, (iii) the determined connection duration being longer corresponds to the probability being higher, and (iv) the determined connection duration being shorter corresponds to the probability being lower.

* * * * *